June 16, 1959 A. E. DILLONAIRE 2,891,206
MOTOR CONTROL CIRCUIT FOR CONSTANT CUTTING SPEED LATHE
Filed Dec. 14, 1954 3 Sheets-Sheet 1

INVENTOR.
Allen E. Dillonaire,
BY Wilkinson, Huxley,
Byron + Hume
attys

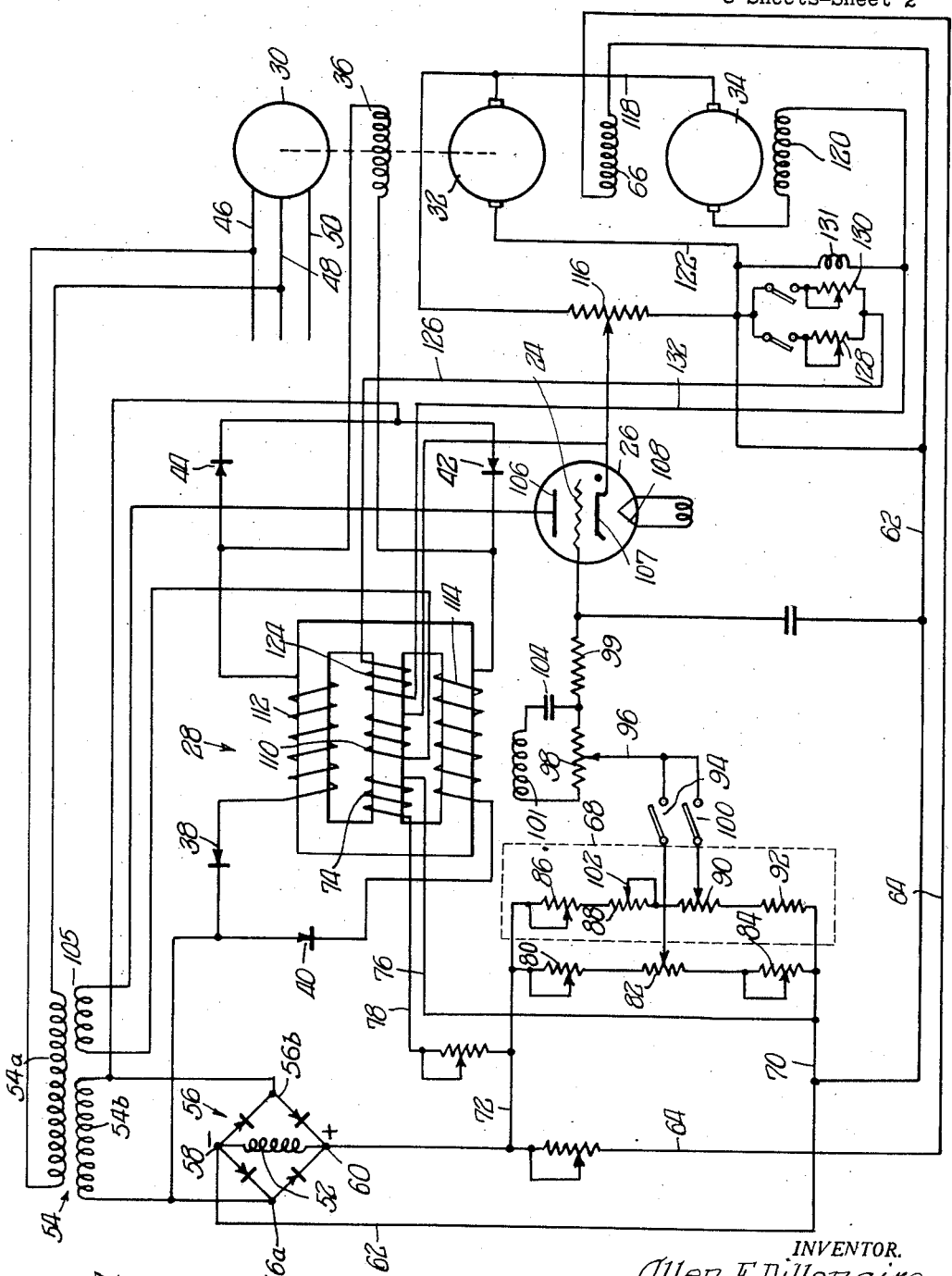

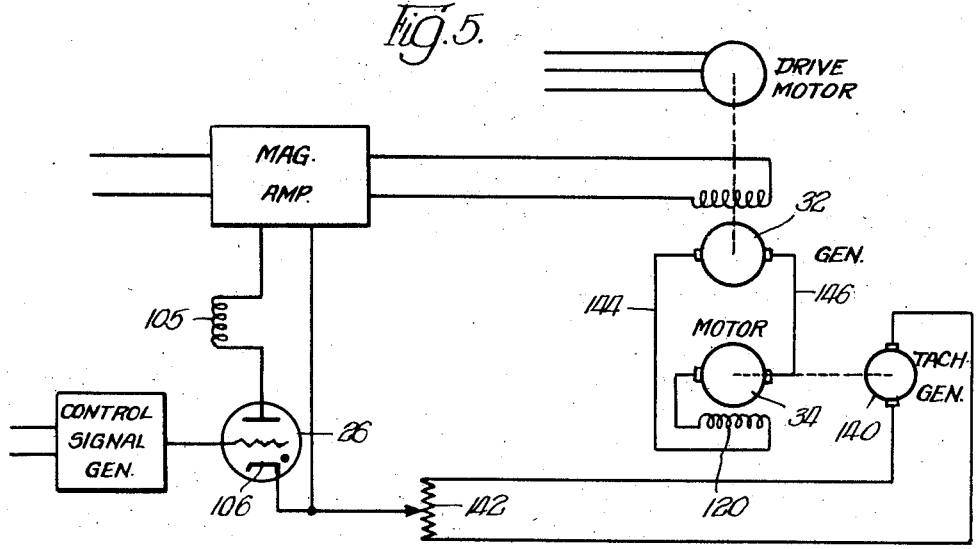
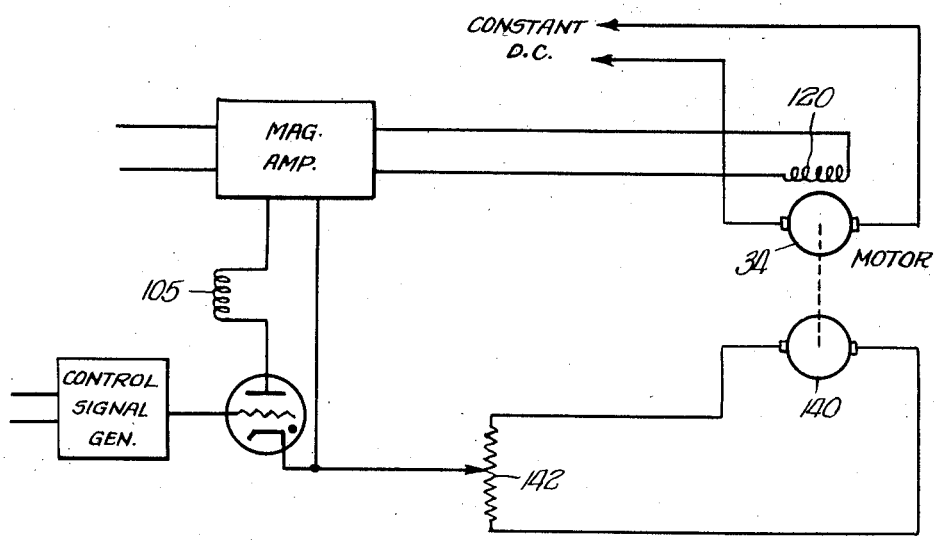

United States Patent Office 2,891,206
Patented June 16, 1959

2,891,206

MOTOR CONTROL CIRCUIT FOR CONSTANT CUTTING SPEED LATHE

Allen E. Dillonaire, Milwaukee, Wis., assignor to The Louis Allis Company, Milwaukee, Wis., a corporation of Wisconsin Application December 14, 1954, Serial No. 475,019

19 Claims. (Cl. 318—145)

This invention relates to a speed control circuit for electric motors and more particularly to a circuit which provides an adjustable speed drive capable of following a selected pattern of operation which characteristic is particularly useful in the speed control of cutting machines operating on a rotating workpiece.

When the cutting tool of a lathe is operating on a rotating workpiece, as it moves inwardly toward the axis of rotation of the workpiece, the speed of the periphery of the workpiece, which is the surface upon which the tool is operating, changes very substantially. Obviously, when the diameter of the workpiece is large, the speed of the outer surface or periphery thereof, relative to a fixed cutting tool, is also large. As the diameter of the workpiece decreases due to the cutting action, the speed of the outer surface or periphery thereof, relative to the tool, also decreases.

In high speed automatic machines, this change in the relative speed of movement of the surface being worked, relative to the tool, can cause great difficulty. Unless some method is incorporated to keep the speed of the surface of the workpiece relative to the cutting tool within suitable limits, high speed cutting tools will have a very short life. Such tools are normally designed to operate within relatively narrow limits with regard to operating temperatures and large changes in cutting speed will therefore normally result in damage or destruction of the tool.

It is therefore one of the objects of this invention to provide an adjustable speed drive which is particularly adapted for use with cutting machines operating on a rotating workpiece.

It is also an object of this invention to provide a speed drive of the character described that is capable of maintaining a constant cutting speed in machines of this character.

Another object of this invention is to provide an adjustable speed drive of the character described which can be operated from an alternating current power source.

Still another object of this invention is to provide such a speed drive which may utilize a magnetic amplifier as one of the components.

Yet another object is to provide a speed drive of the character described which is relatively simple in both construction and operation and yet which gives good speed regulation with excellent stability and response characteristics.

Further objects and advantages of this invention will become evident as the description proceeds and from an examination of the accompanying drawing, which illustrates several embodiments of the invention and in which similar numerals refer to similar parts throughout the several views.

In the drawings:

Figure 4 is a circuit diagram illustrating one embodiment of the invention, some of the elements thereof being shown more or less diagrammatically.

Figure 5 is a diagrammatic representation of a modification of a portion of the circuit shown in Figure 4, utilizing a tachometer generator as the source of feedback voltage.

Figure 6 is a diagrammatic representation of still another modification in which a constant voltage is applied to the armature of the motor and the field voltage is varied, a tachometer generator also being utilized in this circuit as a source of feedback voltage.

Figure 1:
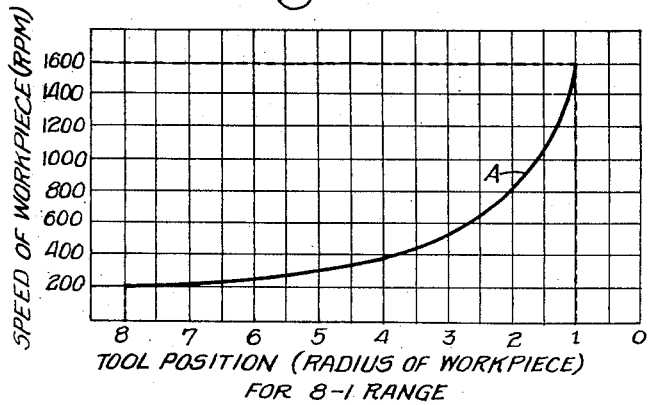
Figure 1 is a graph showing the relationship between the position of a cutting tool and the required speed of the workpiece in r.p.m. at that position of the tool if constant cutting rate is to be maintained.

Referring now to Figure 1, the curve A therein is the curve obtained from plotting the position of the cutting tool in a lathe (measured from the center of rotation of the workpiece) against the speed of rotation of the workpiece necessary for a constant cutting rate. Assuming that the workpiece is a spindle of varying diameter, the tool position is expressed in radii of varying size of such a spindle. The resultant curve is hyperbolic, as shown.

Figure 2:
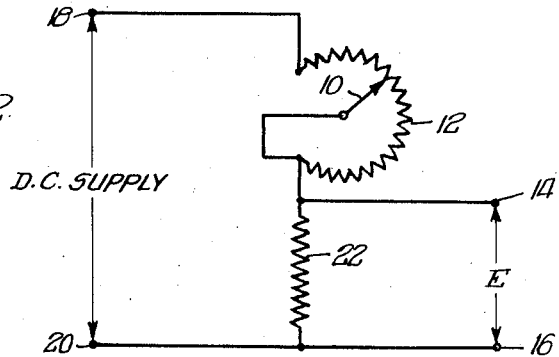
Figure 2 is a diagrammatic representation of an electrical circuit generating a hyperbolic voltage from the linear movement of a linear rheostat.
Figure 3:
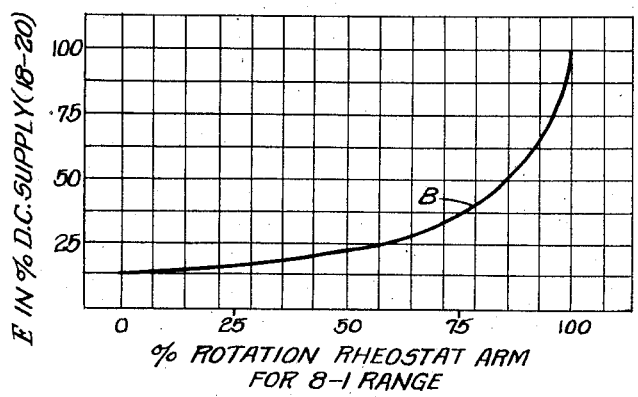
Figure 3 is a graph illustrating the relationship between the hyperbolic voltage obtained from the circuit shown in Figure 2, and the degrees of rotation of the rheostat arm.

Figure 2 is a somewhat diagrammatical circuit diagram of an electrical circuit which is capable of producing from a direct current constant voltage supply an output voltage which follows a hyperbolic curve. Such a curve B is shown in Figure 3 wherein the degrees of rotation of the arm 10 of the rheostat 12 are plotted against the output voltage E which appears across the output terminals 14 and 16. Assuming a constant direct current voltage supply across the input terminals 18 and 20, if the rheostat 12 is linear, then the voltage E which will appear across the fixed resistance 22 upon linear movement of a rheostat arm 10 will follow a hyperbolic curve B. This is true, however, only if little or no current is drawn from the rheostat circuit.

Figure 4 is a circuit diagram illustrating one embodiment of the invention in which a speed control circuit is provided, utilizing a hyperbolic voltage generating circuit such as is shown in Figure 2, as a portion thereof. The output of the hyperbolic voltage generating portion of the circuit shown in Figure 4 (which corresponds to the circuit shown in Figure 2) is fed to the grid 24 of a gas discharge tube such as the thyratron 26. This arrangement will prevent any current from being drawn from the rheostat circuit but will enable full use to be made of the hyperbolic voltage generated as a control voltage as will be discussed below.

The speed control circuit shown in Figure 4 includes the magnetic amplifier indicated generally by the numeral 28. The adjustable speed drive mechanism itself is made up of the alternating current drive motor 30, which in turn drives the direct current generator 32, the output of which is fed to the armature of the direct current motor 34. The current supplied to the generator field 36 is obtained from the output of the magnetic amplifier 28 through a bridge-type rectifier made up of the individual rectifier components 38, 40, 42 and 44.

More specifically, the alternating current drive motor 30 obtains its power from the three-phase alternating current power lines 46, 48 and 50. This source is also utilized to energize the transformer 54 having a primary winding 54a and a secondary winding 54b; the input terminals 56a and 56b of the bridge rectifier indicated generally by the numeral 56 being connected across the secondary winding 54b. The output terminals 58 and 60 of this bridge rectifier are connected to the shunt field 52 (shown for convenience in the bridge rectifier 56) of the direct current motor 34 and are also connected through the lines 62 and 64 to the bucking field 66 of the direct current generator 32.

The hyperbolic voltage generating circuit enclosed in dotted lines and indicated generally by the numeral 68, likewise utilizes the bridge rectifier network 56 as a source of input voltage being connected thereto through the lines 70 and 72. Similarly, the bias winding 74 of the magnetic amplifier 28 is connected across the lines 70 and 72 through the lines 76 and 78, respectively.

A manual circuit and an automatic circuit are provided in the hyperbolic voltage generator 68. The manual circuit includes the resistances 80, 82 and 84, which circuit is disposed in parallel with the automatic circuit made up of the resistances 86, 88, 90 and 92. The potentiometer 82 has the variable arm thereof connected to one terminal of the switch 94 the other terminal thereof being connected to the variable arm 96 of the potentiometer 98. The variable arm of the potentiometer 90 is connected to one terminal of the switch 100 the other terminal thereof being likewise connected to the arm 96 of the potentiometer 98.

The arm 102 of the variable resistance 88 is physically coupled to the feed mechanism in a lathe, for example, so that the resistance 88 is varied linearly with linear motion of the feed mechanism. Resistance 88 therefore corresponds to the resistor 12 shown in Figure 2 and resistance 92 corresponds to resistance 22, shown in that figure.

As previously indicated, a voltage is obtained from either resistance 82 or 90 and fed to the resistor 98. When the switch 94 is closed and the switch 100 is open, the manual circuit is operable. This circuit, contrary to the automatic circuit, provides a linear reference voltage with respect to the rotation of the arm of the potentiometer 82. The circuit is in the form of a voltage divider with the voltage obtained through the switch 94 being proportional to the movement of the potentiometer arm. The automatic circuit on the other hand, as previously described, generates a hyperbolic voltage through linear operation of the rheostat 88. The D.C. signal or bias voltage so generated in the manual or automatic circuit is impressed on the grid 24 of the thyratron tube 26 through the potentiometer 98 and the resistor 99. The tube 26 is also provided with a plate 106, a cathode 107 and a heater 108. A positive feed-back voltage is impressed on the cathode 107 from the resistor 116 which is connected across the output of the direct current generator 32. If the feed-back voltage is less positive than the reference voltage fed to the grid, then the grid is positive with respect to the cathode and the tube will fire on the positive half cycle of the plate voltage, as is described below. If the feed-back voltage is more positive than the reference voltage, the grid is negative with respect to the cathode and the tube will not fire.

The actual control of the firing of the thyratron tube 26 is established through the use of a phase shift circuit made up of the resistor 98 and the condenser 104, forming a closed circuit across the secondary winding 102 of the transformer 54. The elements 98 and 104 are selected so that the voltage across the resistor 98 is about 90° out of phase with the plate voltage obtained from the secondary winding 105. In addition to the D.C. bias voltage, an A.C. voltage is, therefore, supplied to the grid 24 that lags about 90° behind the tube anode voltage at all times. As the differential voltage between the grid 24 and the cathode 27 varies, as has previously been described, the point at which the tube fires in the positive cycle of the plate voltage will vary. This in turn will cause the amount of D.C. voltage applied to the control winding 110 of the magnetic amplifier 28 to be varied in accordance with the differential D.C. voltage on the grid 24.

As the differential voltage increases in a positive direction as from the impression of a positive voltage signal from the hyperbolic voltage generator 68 on the grid 24 of the thyratron tube 26, the amount of D.C. current flowing in the control winding 110 will increase since the point at which the tube fires will be moved up to a point in time earlier in the positive cycle of the plate voltage.

In addition, the impression of the feed-back voltage on the cathode will insure that a control current flows in the control winding 110 only when the speed of the D.C. generator is below that called for by the speed setter. Likewise, if the speed of the D.C. generator is greater than that called for by the hyperbolic control voltage, the differential grid voltage will be such that the tube will not fire. In other words, if there is an error voltage existing between the tube voltages supplying the grid and cathode, it will either permit the tube to fire if the error voltage is positive or prevent the tube from firing if the error voltage is negative. The generated direct current voltage from the generator 32 is applied to the armature of the direct current motor 34, the path being through the line 118, the series field winding 120, the interpole winding 131 and the line 122.

As previously described, the hyperbolic voltage generating circuit 68 can operate successfully only if little or no current is drawn therefrom. The use of the thyratron tube 26 permits this condition to be satisfied, since it can be controlled by a voltage applied to its grid without drawing any appreciable current from the control circuit. Thus, the magnetic amplifier can be controlled in accordance with the hyperbolic voltage without any distortion thereof.

A third control winding 124 is provided for IR drop compensation. This winding is connected by the line 126 to the variable resistors 128 and 130 which are disposed in parallel, with their opposite ends connected to one end of the interpole winding 131. The opposite end of the control winding 124 is connected through the line 132 to the opposite end of the interpole winding 131. As the main load current from the generator 32 to the motor 34 increases, the voltage across the interpole winding 131 also increases and because control winding 124 is connected in parallel with this winding 131, increased current will flow in control winding 124, thereby adjusting the output of the magnetic amplifier 28 to compensate for the increased losses due to the increased load current.

A modified form of circuit is shown in Figure 5 in which a tachometer generator 140 is utilized as a source of feedback voltage. The output of the tachometer generator is fed to the resistor 142 corresponding to the resistor 116 shown in Figure 4 and a selected portion of this voltage appearing across this resistor 142 is applied to the cathode 106 of the thyratron 26.

The remaining portion of the circuit is substantially the same except for the lines 144 and 146 which connect the output of the generator 32 directly to the armature of the motor 34, the field winding 120 being connected in series with the line 144.

In such an arrangement the feedback voltage is obtained directly from the tachometer generator and a speed drive with large speed range and close regulation is thereby obtained.

Figure 6 discloses still another modification in which the output of the magnetic amplifier is applied directly to the field winding 120 of the direct current motor 34 while a source of constant direct current is connected to the armature of the motor 34. Speed regulation is thereby obtained through varying the voltage applied to the field winding of the motor 34. A tachometer generator 140 is again utilized being driven directly by the shaft of the motor 34 and having its output applied to the resistor 142 in the same fashion as previously described in connection with the circuit shown in Figure 5. This latter circuit, of course, eliminates the alternating current drive motor and the direct current generator and therefore is preferable to the circuit shown in Figure 4, in many instances.

In the drawing and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

I claim:

1. An adjustable speed drive comprising a prime mover, a direct current generator having a field winding, said generator being driven by said prime mover, a direct current electric motor having an armature, means for impressing the output of said generator across said armature, means for providing an adjustable unidirectional energizing voltage for said generator field winding, control means for regulating the magnitude of said field voltage adapted to be energized by a control signal input, control signal generator means for producing a hyperbolic function output signal connected to said control means to provide said control signal input, and means for applying a portion of the output of said direct current generator as a feedback voltage to said control signal generator to maintain the output of the former in conformity with said hyperbolic control signal.

2. An adjustable speed drive comprising a prime mover, a direct current generator having a field winding, said generator being driven by said prime mover, a direct current electric motor having an armature, means for impressing the output of said generator across said armature, means for providing an adjustable unidirectional energizing voltage for said generator field winding, control means for regulating the magnitude of said field voltage adapted to be energized by a control signal input, a control signal generator connected to said control means to provide said control signal input, a control member in said control signal generator adapted to produce a hyperbolic output voltage in response to linear movement thereof thereby to control said signal generator for producing a hyperbolic function output signal and means for applying a portion of the output of said direct current generator as a feedback voltage to said control signal generator to maintain the output of the former in conformity with said hyperbolic control signal.

3. An adjustable speed drive comprising a prime mover, a direct current generator having a field winding, said generator being driven by said prime mover, a direct current electric motor having an armature, means for impressing the output of said generator across said armature, means for providing an adjustable unidirectional energizing voltage for said generator field winding, control means for regulating the magnitude of said field voltage adapted to be energized by a control signal input, a control signal circuit connected to said control means, a grid controlled firing valve having a plate and a cathode in said control signal circuit, a source of hyperbolic function variable reference voltage connected to the grid of said firing valve, means for applying a selected portion of the output voltage of said direct current generator to the cathode of said firing valve, and a power source connected in series with said control means in said control circuit between the plate and cathode of said firing valve.

4. An adjustable speed drive comprising a prime mover, a direct current generator having a field winding, said generator being driven by said prime mover, a direct current electric motor having an armature, means for impressing the output of said generator across said armature, a voltage regulator having alternating current input terminals and direct current output terminals, said output terminals being connected to said field winding, control means in said voltage regulator adapted to be energized by a control signal input, a control signal circuit connected to said control means, a grid controlled firing valve having a plate and cathode in said control signal circuit, a source of hyperbolic function variable reference voltage connected to the grid of said firing valve, means for applying a selected portion of the output voltage of said generator as a feedback voltage to the cathode of said firing valve, and a power source for said control signal circuit, the output of the latter being controlled by said firing valve and being fed to said control means in said voltage regulator when said valve fires, the firing of said valve in turn being controlled by the difference in relative magnitude between the voltage applied to said grid and that applied to said cathode.

5. An adjustable speed drive comprising a prime mover, a direct current generator having a field winding, said generator being driven by said prime mover, a direct current electric motor having an armature, means for impressing the output of said generator across said armature, a magnetic amplifier having a direct current output, a control winding in said magnetic amplifier, the output of said magnetic amplifier being connected to said generator field winding, a control signal generator connected to said control winding, a grid controlled firing valve in said control signal generator having a plate and a cathode, a source of hyperbolic function variable reference voltage connected to the grid of said firing valve, means for applying a selected portion of the output voltage of said direct current generator to the cathode of said firing valve and a power source for said control signal generator connected in series with said control winding and said plate of said valve.

6. In an adjustable speed drive having a power driven direct current generator with a field winding, a source of field winding voltage and a regulator for said voltage adapted to be controlled by a control voltage input, a control voltage generating circuit comprising a grid controlled firing valve having a plate and a cathode, a source of hyperbolic function variable reference voltage connected to said grid, means for applying a selected portion of the output voltage of said direct current generator to said cathode, a power source for said circuit connected in series with the plate of said firing valve and means for applying the output voltage of said circuit to said regulator as a control voltage input.

7. In an adjustable speed drive having a power driven direct current generator with a field winding, a source of field winding voltage and a regulator for said voltage adapted to be controlled by a control voltage input; a control voltage generating circuit connected to said regulator for providing said control voltage input comprising a grid controlled firing valve having a plate and a cathode, a unidirectional voltage source, a fixed resistance, a linear rheostat connected in series with said fixed resistance, said fixed resistance and said rheostat being connected in series with said voltage source, means connecting one side of said fixed resistance to the grid of said firing valve, means for applying a selected portion of the output voltage of said direct current generator to said cathode and a power source connected in series with the plate of said firing valve.

8. In an adjustable speed drive having a power driven direct current generator with a field winding, a magnetic amplifier with a direct current output and a control winding; a control voltage generating circuit connected to said control winding comprising a grid controlled firing valve having a plate and a cathode, a fixed resistance, a linear rheostat connnected in series with said fixed resistance, a unidirectional voltage source in series with said fixed reistance and said rheostat, means connecting one side of said fixed resistance to the grid of said firing valve whereby the voltage applied to said grid varies hyperbolically with linear variations in rheostat position, means for applying a selected portion of the output voltage of said direct current generator to said cathode, a power source for said valve connected in series with the plate thereof and means for applying the output voltage of said circuit to said magnetic amplifier as a control voltage output.

9. An adjustable speed drive comprising a prime mover, a direct current generator having a field winding, said generator being driven by said prime mover, a direct current electric motor having an armature, means for impressing the output of said generator across said armature, means for providing an adjustable unidirectional energizing voltage for said generator field winding, a control means for regulating the magnitude of said field voltage adapted to be energized by a control signal input, control signal generator means for producing a hyperbolic function output signal connected to said control means to provide said control signal input, and means providing a voltage proportional to the speed of the direct current motor connected to said control signal generator to maintain the speed of said motor in conformity with said control signal.

10. An adjustable speed drive comprising a prime mover, a direct current generator having a field winding, said generator being driven by said prime mover, a direct current electric motor having an armature, means for impressing the output of said generator across said armature, means for providing an adjustable unidirectional energizing voltage for said generator field winding, control means for regulating the magnitude of said field voltage adapted to be energized by a control signal input, control signal generator means for producing a hyperbolic function output signal connected to said control means to provide said control signal input, and a tachometer generator driven by said motor providing a voltage proportional to the speed of said motor, means for applying said voltage to said control signal generator to maintain the speed of said motor in conformity with said control signal.

11. An adjustable speed drive comprising a direct current electric motor having an armature and a field winding, a magnetic amplifier with input terminals for alternating current and output terminals connected to provide an adjustable unidirectional energizing voltage for said field winding, control winding means in said magnetic amplifier, a control circuit connected to said control winding means, control signal generator means in said control circuit for producing a hyperbolic function output signal, a constant potential power supply connected to said armature, a tachometer generator driven by said motor, the output of which is applied as a feedback voltage to said control signal generator to maintain the output of said tachometer generator in conformity with said hyperbolic control signal.

12. An adjustable speed drive comprising a direct current electric motor having an armature and a field winding, a magnetic amplifier with input terminals for alternating current and output terminals connected to provide an adjustable unidirectional energizing voltage for said field winding, control winding means in said magnetic amplifier, a control circuit connected to said control winding means, control signal generator means in said control circuit for producing a hyperbolic function output signal, a constant potential power supply connected to said armature, and means providing a voltage proportional to the speed of the direct current motor connected to said control signal generator to maintain the speed of said motor in conformity with said control signal.

13. An adjustable speed drive comprising a rotatable member; voltage responsive means for controlling the speed at which said rotatable member is driven; amplifier means providing an adjustable unidirectional control voltage to said last named means; control means in said amplifier means for regulating the magnitude of said energizing voltage, said control means being adapted to be energized by a control signal input; a control signal generator connected to said control means to provide said control signal input; a control member in said control signal generator adapted to produce a hyperbolic output voltage in response to linear movement thereof to control said signal generator for producing a hyperbolic function output signal; and means providing a voltage proportional to the speed of said rotatable member connected to said control signal generator to maintain the speed of said rotatable member in uniformity with said control signal.

14. An adjustable speed drive comprising a rotatable member; voltage responsive means for controlling the speed at which said rotatable member is driven; amplifier means providing an adjustable unidirectional control voltage to said last named means; control means in said amplifier means for regulating the magnitude of said energizing voltage, said control means being adapted to be energized by a control signal input; a grid controlled firing valve having a plate and cathode in said control signal circuit; a hyperbolic control signal generator connected to the grid of said valve and means providing a voltage proportional to the speed of said rotatable member connected to said cathode of said valve; and a power source for said control signal circuit the output of the latter being controlled by the firing of said valve and being fed to said control means in said magnetic amplifier when said valve fires, the firing of said valve in turn being controlled by the difference in the magnitude of the voltage applied to said grid and that applied to said cathode.

15. In an adjustable speed drive, amplifier means providing an adjustable unidirectional control voltage for controlling the speed of said drive; control means in said amplifier means for regulating the magnitude of said energizing voltage, said control means being adapted to be energized by a control signal input; a control signal generator connected to said control means to provide said control signal input; a control member in said control signal generator adapted to produce a hyperbolic output voltage in response to linear movement thereof thereby to control said signal generator for producing a hyperbolic function output signal; and means providing a voltage proportional to the speed of said drive connected to said control signal generator to maintain the speed of said drive in uniformity with said control signal.

16. In an adjustable speed drive having a direct current motor, means providing an adjustable unidirectional voltage for controlling the speed of said motor; control means regulating the magnitude of said voltage; control signal generator means for producing a hyperbolic function output signal; means connecting the output of said control signal generator to said control means; means providing a feedback voltage the magnitude of which is proportional to the speed of said motor; and means for applying a portion of said feedback voltage to said control means so as to maintain the output of said first named means in conformity with said hyperbolic control signal.

17. In an adjustable speed drive having a direct current motor, a magnetic amplifier providing an adjustable unidirectional voltage; means for controlling the speed of said motor to which said voltage is applied; control means in said magnetic amplifier; a control signal circuit connected to said control means; means for controlling said control signal circuit to produce a hyperbolic function output signal; means for providing a feedback voltage the magnitude of which is proportional to the speed of said motor; and means for applying a portion of said feedback voltage to said control signal circuit so that the output of said magnetic amplifier is maintained in conformity with said hyperbolic signal.

18. In an adjustable speed drive having a direct current motor, a magnetic amplifier providing an adjustable unidirectional voltage; means for controlling the speed of said motor to which said voltage is applied; control means in said magnetic amplifier; a control signal circuit connected to said control means; a grid controlled firing valve having a plate and cathode in said control signal circuit; a source of hyperbolic voltage connected to the grid of said valve; means for providing a feedback voltage, the magnitude of which is proportional to the speed of said motor; means for applying a selected portion of said feedback voltage to said cathode of said valve; and a power source for said control signal circuit the output of the latter being controlled by the firing of said valve and being fed to said control means in said magnetic amplifier when said valve fires, the firing of said valve in turn being controlled by the difference in the magnitude of the voltage applied to said grid and that applied to said cathode.

19. In an adjustable speed drive having a power driven direct current generator with a field winding and a magnetic amplifier having a direct current output and a control winding connected as a source of field winding voltage, a control voltage generating circuit for said magnetic amplifier comprising a grid controlled firing valve having a plate and a cathode, a source of reference voltage connected to said grid providing a voltage that is hyperbolic in character, means for applying a selected portion of the output voltage of said direct current generator to said cathode, a power source for said circuit connected in series with the plate of said firing valve and means for applying the output voltage of said circuit to the control winding of said magnetic amplifier as a control voltage.

References Cited in the file of this patent

UNITED STATES PATENTS

| | | |
|---|---|---|
| 2,594,015 | Halter | Apr. 22, 1952 |
| 2,743,401 | Moore et al. | Apr. 24, 1956 |

OTHER REFERENCES

"Electronics in Industry," G. M. Chute; Figs. 15H, 15I; pp. 191–92; McGraw-Hill, New York, 1946.